United States Patent

Knell et al.

[15] 3,694,440
[45] Sept. 26, 1972

[54] TRIS(HYDROXYALKYLPHENYL) DERIVATIVES OF THIOPROPIONYL HEXAHYDROTRIAZINE

[72] Inventors: Martin Knell, Ossining, N.Y. 10562; David H. Steinberg, Bronx, N.Y. 10468

[73] Assignee: Ciba-Geigy Corporation, Ardsley, N.Y.

[22] Filed: June 1, 1971

[21] Appl. No.: 149,048

[52] U.S. Cl............260/248 NS, 260/45.8, 252/401, 252/50, 99/163
[51] Int. Cl..............................................C07d 55/12
[58] Field of Search................................260/248 NS

[56] References Cited

UNITED STATES PATENTS 3,538,092  11/1970  Dexter......................260/248
3,567,724  3/1971  Beears......................260/248

Primary Examiner—John M. Ford
Attorney—Karl F. Jorda and Nestor W. Shust

[57] ABSTRACT

Tris(hydroxyalkylphenyl) derivatives of thiopropionyl hexahydrotriazine compounds can be prepared by reacting 1,3,5-tris(hydroxyethylthiopropionyl)-hexahydro-1,3,5-triazine with 4-hydroxy-3,5-dialkylphenylpropionyl chloride or benzoyl chloride. An example of such compounds is 1,3,5-tris(4'-hydroxy-3',5'-di-tert-butylphenylpropionyloxyethylthiopropionyl)-hexahydro-1,3,5-triazine. These compounds are useful as stabilizers of organic substrates subject to oxidative and thermal degradation.

5 Claims, No Drawings

3,694,440

TRIS(HYDROXYALKYLPHENYL) DERIVATIVES OF THIOPROPIONYL HEXAHYDROTRIAZINE

DETAILED DISCLOSURE

The compounds of this invention are tris(hydroxyalkylphenyl) derivatives of thiopropionyl hexahydrotriazines which can be represented by the generic formula

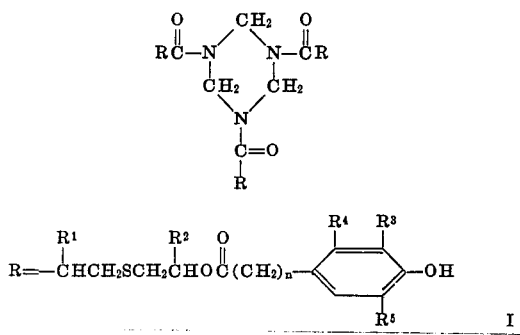

wherein
R$^1$, R$^2$ and R$^4$ are independently hydrogen or methyl,
R$^3$ and R$^5$ are independently hydrogen or (lower)alkyl, and
$n$ is 0 to 2.

The groups R$^1$, R$^2$ and R$^4$ are preferably hydrogen. The groups R$^3$ and R$^5$ besides hydrogen can be (lower)alkyl groups having from one to six carbon atoms. Illustrative examples of such groups are methyl, ethyl, propyl, isopropyl, butyl, tert-butyl, and various isomers of pentyl and hexyl. Preferably, those groups are methyl or tert-alkyl groups such as tert-butyl, tert-pentyl, and tert-hexyl. The value of n is preferably 2.

The compounds of this invention can be prepared by a number of methods available in the art. Following is the description of various methods that can be employed.

The compounds of this invention can be prepared as follows:

(1) 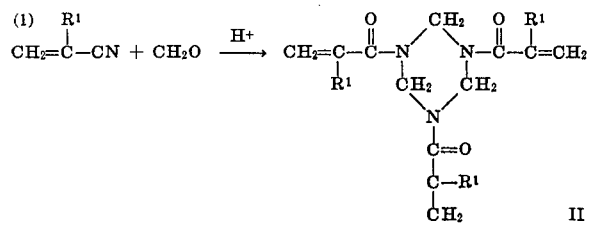

(2) 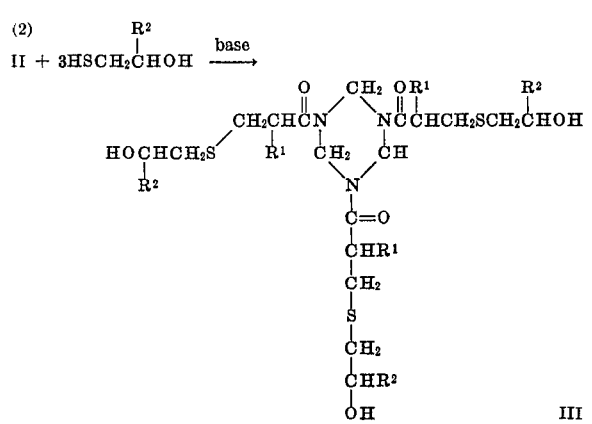

This reaction is catalyzed by strong bases such as sodium methylate, trimethylbenzylammonium methylate and the like.

(3) 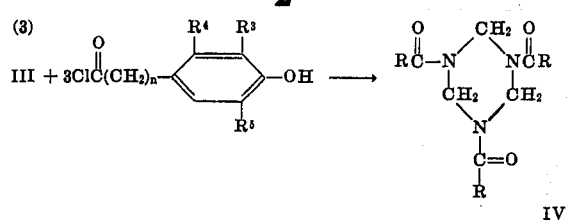

This reaction is best carried out in the presence of an acid acceptor such as pyridine, triethylamine, sodium hydroxide, and the like.

Other methods of preparation are, for example, the reaction of mercaptoalkanol with a hydroxyaromatic acid to give a mercaptoalkyl ester which can then be reacted with the tris acrylyl or methacrylyl hexahydrotriazine, e.g.:

(1) 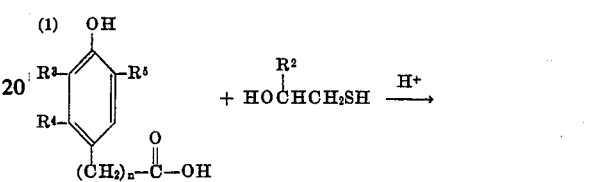

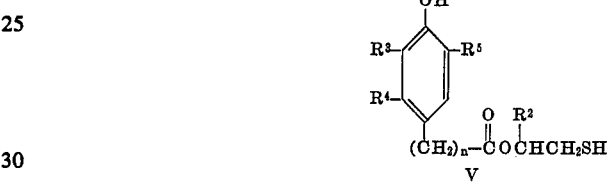

(2) 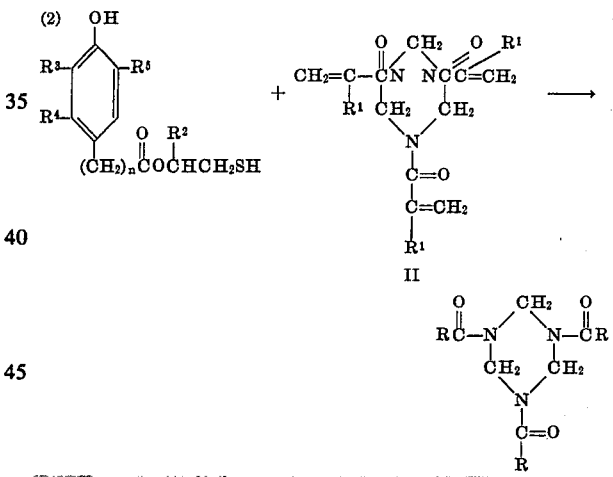

Another method of preparation is as follows:

(1) 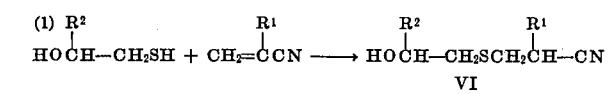

(2) 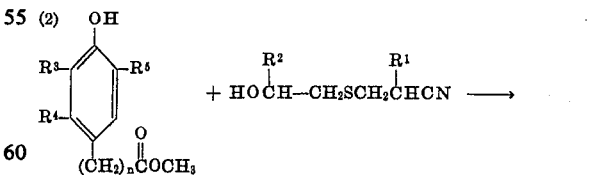

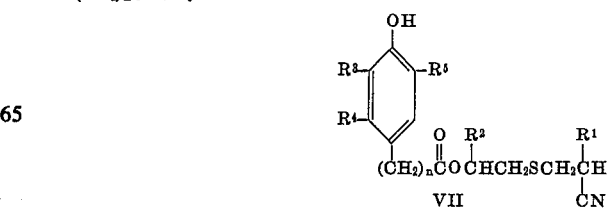

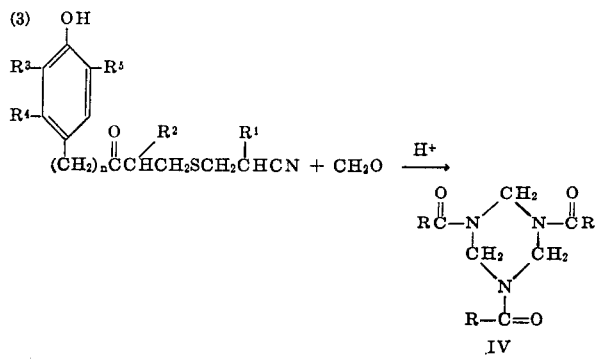

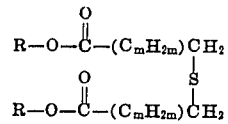

The dialkyl-4-hydroxyphenyl derivatives of thiopropionyl hexahydro triazine are useful as stabilizers of organic materials normally subject to oxidative and thermal deterioration. Such organic materials include: synthetic organic polymeric substances such as vinyl resins formed from the polymerization of vinyl halides or from the copolymerization of vinyl halides with vinylesters and unsaturated hydrocarbons such as butadienes and styrene; poly-α-olefins; polyurethanes and polyamides such as polyhexamethylene adipamide and polycaprolactam; polyesters such as polyethylene terephthalates; polycarbonates; polyacetals; polystyrene; polyethyleneoxide; and copolymers such as those of high impact polystyrene containing copolymers of butadiene and styrene and those formed by the copolymerization of acrylonitrile, butadiene, and/or styrene.

Other materials which can be stabilized by the compounds of the present invention include lubricating oil of the aliphatic ester type, i.e., di(2-ethylene)-azelate, pent-aerythritol tetracaptoate, and the like; animal and vegetable derived oils, e.g., linseed oil, fat, tallow, lard, peanut oil, cod liver oil, castor oil, palm oil, corn oil, cottonseed oil, and the like; hydrocarbon materials such as gasoline, mineral oil, fuel oil, drying oil, cutting fluids, waxes, resins, and the like, salts of fatty acids such as soaps and the like.

In general, one or more of the stabilizers of the present invention are employed in amounts, in toto, of from about 0.005 percent to about 5 percent by weight of the composition to be stabilized. A particularly advantageous range of the present stabilizers is from about 0.05 percent to about 2 percent. The preferred range is particularly effective in polyolefins such as polypropylene.

These compounds may be incorporated in the polymer substance during the usual processing operations, for example, by hot-milling, the composition then being extruded, pressed, roll-molded or the like into films, fibers, filaments, hollow-spheres and the like. The heat stabilizing properties of these compounds advantageously stabilize the polymer against degradation during such processing at the high temperatures generally encountered.

The stabilizers employed in this invention can also be used in combination with other stabilizers or additives. Especially useful co-stabilizers are dilauryl-β-thiodipropionate and distearyl-β-thiodipropionate.

The following formula represents co-stabilizers which are in certain instances very useful in combination with the stabilizers of this invention:

wherein R is an alkyl group having from six to 24 carbon atoms; and m is an integer from 1 to 6. The above co-stabilizers are used in the amount of from 0.01 to 2 percent by weight of the organic material, and preferably from 0.1 to 1 percent.

Other antioxidants, antiozonants, thermal stabilizers, ultraviolet light absorbers, coloring materials, dyes, pigments, metal chelating agents, etc., may also be used in the compositions in combination with the stabilizers of the invention.

The following are presented to further illustrate the present invention without introducing any limitation thereto.

EXAMPLE 1

1,3,5-Tris(hydroxyethylthiopropionyl)-hexahydro-1,3,5-triazine

To a methanol solution of 1 mole of 1,3,5-triacrylyl-hexahydro-b 1,3,5-triazine [Wegler, R and Ballauf, A., Ber. 8l, 527 (1948) ] containing 3 mole percent of trimethylbenzylammonium hydroxide is added dropwise with stirring a solution of 3 mole of 2-mercaptoethanol in methanol. After the addition, the reaction mixture is kept at 35°C until TLC indicates the reaction is complete, after which it is cooled, filtered from a small amount of insoluble and the solvent stripped under vacuum. The residue is dissolved in water and extracted into isobutyl alcohol. After washing with saturated sodium chloride solution, the solvent is removed under vacuum, leaving a solid residue which is then washed with ether to give the product, 1,3,5-tris(hydroxyethylthiopropionyl) hexahydro-1,3,5-triazine which melts at 52°–4°C.

EXAMPLE 2

1,3,5-Tris(4'-hydroxy-3',5'-di-tert-butylphenylpropionyloxyethylthiopropionyl)-hexahydro-1,3,5-triazine To a mixture of 0.1 mole of 1,3,5-tris(hydroxyethylthiopropionyl)-hexahydro-1,3,5-triazine in 100 ml of dry benzene is added a solution of 0.33 mole of 4-hydroxy-3,5-di-tert-butylphenylpropionyl chloride in benzene. Pyridine (0.33 mole) is then added dropwise and the reaction mixture is stirred overnight. After filtering off the solid, the filtrate is washed successively with water, 2 N sodium hydroxide and again with water. The product, 1,3,5-tris(4'-hydroxy-3''-di-tert-butylphenylpropionyloxyethylthiopropionyl)-hexahydro-1,3,5-triazine is purified by elution chromatography from a silica gel column using benzene-heptane (1:1). After drying the product is obtained as a glass which softens at 55°C.

Analysis for $C_{69}H_{105}N_3O_{12}S_3$:

% Calculated: C, 65.52, H, 8.37; N, 3.32; S, 7.61
% Found: C, 65.45; H, 8.24; N, 3.22; S, 7.70.

EXAMPLE 3

Following the procedure of Example 1, only using 1- mercapto-2-propanol instead of 2-mercaptoethanol, there is obtained 1,3,5-tris(2'-hydroxypropylthiopropionyl)-hexahydro-1,3,5-triazine.

EXAMPLE 4

Following the procedure of Example 2, only using 1,3,5-tris(2'-hydroxypropylthiopropionyl)-hexahydro-1,3,5-triazine instead of 1,3,5-tris(2'-hydroxyethylthiopropionyl)-hexahydro-1,3,5-triazine and 4-hydroxy-3,5-di-tert-butylbenzoyl chloride instead of 4-hydroxy-3,5-di-tert-butylphenylpropionyl chloride, there is obtained 1,3,5-tris[2'(4''-hydroxy-3'', 5''-di-tert-butylbenzoyloxy)propylthiopropionyl]-hexahydro-1,3,5-triazine.

EXAMPLE 5

Following the procedure of Example 1, only using 1,3,5-trimethacrylyl-hexahydro-1,3,5-triazine instead of 1,3,5-triacrylylhexahydro-1,3,5-triazine is obtained 1,3,5-tris(hydroxyethylthio-α-methylpropionyl)-hexahydro-1,3,5-triazine.

EXAMPLE 6

Following the procedure of Example 2, only using 1,3,5-tris(hydroxyethylthio-α-methylpropionyl)-hexahydro-1,3,5-triazine instead of 1,3,5-tris(hydroxyethylthiopropionyl)-hexahydro-1,3,5-triazine is obtained 1,3,5-tris(4'-hydroxy-3', 5'-di-tert-butylphenylpropionyloxyethylthio-α-methylpropionyl)-hexahydro-1,3,5-triazine.

TABLE I

Other compounds prepared are as follows:

| $R^1$ | $R^2$ | $R^3$ | $R^4$ | $R^5$ | n |
|---|---|---|---|---|---|
| H | H | $CH_3$ | H | $t\text{-}C_4H_9$ | 2 |
| H | H | $t\text{-}C_4H_9$ | H | $t\text{-}C_4H_9$ | 1 |
| H | H | $t\text{-}C_4H_9$ | H | $t\text{-}C_4H_9$ | 0 |
| H | H | $CH_3$ | $CH_3$ | $t\text{-}C_4H_9$ | 2 |
| $CH_3$ | H | $t\text{-}C_4H_9$ | H | $t\text{-}C_4H_9$ | 0 |
| H | $CH_3$ | $CH_3$ | H | $t\text{-}C_4H_9$ | 2 |

EXAMPLE 7

Unstabilized polypropylene powder (Hercules Profax 6501) is thoroughly blended with 0.5 percent by weight of 1,3,5-tris(4'-hydroxy-3', 5'-di-tert-butylphenylpropionyloxyethylthiopropionyl)-hexahydro-1,3,5-triazine. The blended material is then milled on a two-roll mill at 182°C for 10 minutes, after which time the stabilized polypropylene is sheeted from the mill and allowed to cool.

The milled polypropylene sheets are then cut into pieces and pressed for 7 minutes on a hydraulic press at 218°C, 2,000 pounds per square inch pressure. The resulting sheet of 25 mil thickness is tested for resistance to accelarated aging in a forced draft oven at 150°C. The stabilized polypropylene is found to be much more stable compared to the unstabilized composition.

Stabilized polypropylene compositions are also obtained when 0.05 percent of the above compound is employed.

EXAMPLE 8

The 39.3 g of hexamethylene diammonium adipate is added 0.177 g (7.5 × 10 mole; 0.5 mole percent) of hexamethylene diammonium diacetate as molecular weight control agent, and 0.1 percent of theoretical nylon yield of 1,3,5-tris(4'-hydroxy-3',5'-di-t-butylphenylpropionyloxyethylthiopropionyl)-hexahydro-1,3,5-triazine. The mixture is blended thoroughly and added to a Pyrex polymer tube.

The polymer tube is evacuated three times and each time filled with high purity nitrogen. The polymer tube with the continuously maintained, slightly positive nitrogen pressure, is placed in a methyl salicylate vapor bath at 220°C. After 1 hour at 222°C, the polymer tube is transferred to an o-phenyl-phenol bath at 285°C for 1 hour. The polymer tube is kept in the 285°C vapor bath for an additional one-half hour while it is maintained under vacuum of less than 1 mm pressure. High purity nitrogen is then readmitted and the polymer tube is allowed to cool.

The nylon-6,6 obtained is ground in a mill at ambient temperature of 25°C. About 2 g are heated in a small glass Petri dish in a circulating air-rotary oven at 140°C for 65 hours. The viscosity of a 1 percent sulfuric acid solution of aged and unaged polymer samples are determined at 25°C. Stabilizer effectiveness is judged by the percent retention of specific viscosity, color-formation, and weight retention after oven aging. The stabilized polyamide has better viscosity, color retention and substantially less weight loss than a polyamide which is unstabilized after oven aging.

EXAMPLE 9

High impact polystyrene resin containing elastomer (i.e., butadiene-styrene) is stabilized against loss of elongation properties by incorporation of 0.1 percent by weight of tris[2'(4''-hydroxy-3'',5''-di-t-butylbenzoyloxy)propylthiopropionyl]-hexahydro-1,3,5-triazine. Under the test conditions described below, the stabilized resin retains a higher percentage of its original elongation properties, whereas the unstabilized resin retains less elongation properties. A substantial improvement in stability is also noted when only 0.05 percent of the stabilizer is employed.

The unstabilized resin is dissolved in chloroform and the stabilizer then added, after which the mixture is cast on a glass plate and the solvent evaporated to yield a uniform film which, upon drying, is removed and cut up, and then pressed for 7 minutes at a temperature of 163°C and a pressure of 2,000 pounds per square inch into a sheet of uniform thickness (25mil). The sheets are then cut into strips, approximately 4 × 0.5 inches. A portion of these strips is then measured for length of elongation in the Instron Tensile tester (Instron Engineering Corporation, Quincy, Mass.). The remaining portion of the strips is aged in a forced draft oven for 6 weeks at 75°C and thereafter tested for elongation. The stabilized polystyrene resin has retained much better its elongation property than the unstabilized resin.

What is claimed is:

1. A compound having the formula

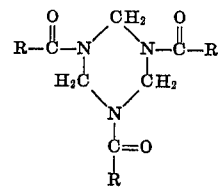

wherein
R is a group

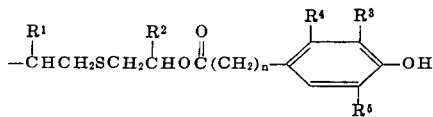

R¹, R² and R⁴ are independently hydrogen or methyl group,
R³ and R⁵ are independently hydrogen or (lower)alkyl groups, and
n is an integer 0 to 2.

2. A compound according to claim 1 wherein R¹, R² and R⁴ are hydrogen, R³ and R⁵ are methyl or tert-butyl groups and n is 2.

3. The compound according to claim 1 which is 1,3,5-tris(4'-hydroxy-3',5'-di-tert-butylphenylpropionyloxyethylthiopropionyl) hexahydro-1,3,5-triazine.

4. The compound according to claim 1 which is 1,3,5-tris[2'(4''-hydroxy-3'',5''-di-tert-butylbenzoyloxy)propylthiopropionyl] hexahydro-1,3,5-triazine.

5. The compound according to claim 1 which is 1,3,5-tris(4'-hydroxy-3',5'-di-tert-butylphenylpropionyloxyethylthio-α-methylpropionyl) hexahydro-1,3,5-triazine.

* * * * *

UNITED STATES PATENT OFFICE
CERTIFICATE OF CORRECTION

Patent No. 3,694,440          Dated 9/26/72

Inventor(s) Martin Knell and David H. Steinberg

It is certified that error appears in the above-identified patent and that said Letters Patent are hereby corrected as shown below:

1. Column 1, between lines 45-50, that part of the structure "C-R' " with CH$_2$ attached by a thin line should read "C-R' " with CH$_2$ attached by a thick line.

2. Column 1, line 55, that part of the structure "N" with CH$_2$ below should be changed to "N" with CH below.

3. Column 4, line 26, "hexahydro-b" should be changed to "hexahydro".

4. Column 4, line 56, "3" " should be changed to "3',5' ".

5. Column 5, line 21, "hydroxyethylthiotα" should be changed to "hydroxyethylthio-α".

6. Column 6, line 35, insert ---1,3,5--- in front of "tris".

7. Column 6, after end of Example 9, line 58, add Example 10. ---Example 10 - To 50 g of polyacetal resin containing an acid scavenger dicyandiamide is added 0.1 percent of 1,3,5-tris(4'-hydroxy-3',5'-di-t-butylphenylpropionyloxy-ethylthio-α-methylpropionyl)-hexahydro-1,3,5-triazine.

UNITED STATES PATENT OFFICE
CERTIFICATE OF CORRECTION

Patent No. 3,694,440　　　　　　Dated 9/26/72

Inventor(s) Martin Knell and David H. Steinberg

It is certified that error appears in the above-identified patent and that said Letters Patent are hereby corrected as shown below:

The resin containing this additive is milled for 7 minutes at 200°C in a Brabender Plasti-recorder. The milled formulation is subsequently pressed into a 40 mil sheet at 215°C at 350 psi for 90 seconds then cooled quickly in a cold press at 350 psi. The stabilized sheets are then remolded for 2 minutes at compact pressure and for 3 minutes at 300° psi at 215°C to give plaques 1 1/2" x 2 1/4" x 125 mil. The resulting plaques are tested for resistance to accelerated aging in a force draft oven at 140°C. Unstabilized samples of polyacetal containing only dicyandiamide are tested in the same manner and the results show that the composition containing the above triazine compound is substantially more stable than the unstabilized composition.

Signed and sealed this 26th day of November 1974.

(SEAL)
Attest:

McCOY M. GIBSON JR.　　　　　　C. MARSHALL DANN
Attesting Officer　　　　　　　　Commissioner of Patents